United States Patent
Duret et al.

[11] Patent Number: 6,082,342
[45] Date of Patent: Jul. 4, 2000

[54] PROCESS FOR CONTROLLING SELF-IGNITION IN A 4-STROKE ENGINE

[75] Inventors: Pierre Duret, Sartrouville; Jacques Lavy, Guillancourt, both of France

[73] Assignee: Institut Francais Du Petrole, Cedex, France

[21] Appl. No.: 09/034,228

[22] Filed: Mar. 4, 1998

[30] Foreign Application Priority Data

Mar. 7, 1997 [FR] France .................................. 97 02822

[51] Int. Cl.[7] ................................................. F02M 25/07
[52] U.S. Cl. ........................................................ 123/568.14
[58] Field of Search .......................... 123/568.11, 568.14, 123/90.15, 90.16, 531, 556

[56] References Cited

U.S. PATENT DOCUMENTS

| | | | |
|---|---|---|---|
| 3,494,336 | 2/1970 | Myers et al. | 123/568.14 |
| 4,280,451 | 7/1981 | Moore | 123/90.15 |
| 4,426,986 | 1/1984 | Muller et al. | 123/568.14 |
| 4,700,684 | 10/1987 | Pischinger et al. | 123/568.14 |
| 5,036,824 | 8/1991 | Albertson et al. | 123/531 |
| 5,123,397 | 6/1992 | Richeson | 123/568.14 |
| 5,224,460 | 7/1993 | Havstad et al. | 123/568.14 |
| 5,367,990 | 11/1994 | Schechter | 123/568.14 |

FOREIGN PATENT DOCUMENTS

| | | |
|---|---|---|
| 0560476 | 9/1993 | European Pat. Off. . |
| 2134596 | 8/1984 | United Kingdom . |
| 9316276 | 8/1993 | WIPO . |

*Primary Examiner*—Willis R. Wolfe
*Attorney, Agent, or Firm*—Antonelli, Terry, Stout & Kraus, LLP

[57] ABSTRACT

The present invention is a process for controlling self-ignition in a four-stroke engine comprising variable control of the opening and the closing of the intake and exhaust in the combustion chamber as a function of the engine load. At partial load the invention performs (a) prolonged retention of burned gases in the combustion chamber, and (b) a fresh gas intake period which overall follows the retention period, in order to minimize mixing of the fresh gases with the burned gases and to control the amount of burned gases retained in the combustion chamber.

21 Claims, 3 Drawing Sheets

PROCESS FOR CONTROLLING SELF-IGNITION IN A 4-STROKE ENGINE

BACKGROUND OF THE INVENTION

1. Field of the Invention

The present invention relates to self-ignition 4-stroke internal-combustion engines.

2. Description of the Prior Art

Self-ignition is a well-known phenomenon in 2-stroke engines. This combustion type has advantages as regards emissions: low hydrocarbon and nitrogen oxides emissions are notably obtained.

Very low nitrogen oxides emissions can be obtained for 4-stroke engines. Furthermore, a remarkable cycle regularity is achieved during self-ignition combustion.

Self-ignition is a phenomenon which allows initiation of combustion by means of residual burned gases which remain in the combustion chamber after combustion.

Self-ignition is achieved by controlling the amount of residual gases and the mixing thereof with the fresh gases (not burned yet). The residual gases (hot burned gases) initiate the combustion of the fresh gases thanks to a combination of temperature and of the presence of active species (radicals).

In 2-stroke engines, the presence of residual gases is "inherent" in the combustion. In fact, when the load of the engine decreases, the amount of fresh gases decreases and is naturally replaced by an amount of residual gases (burned gases from the previous cycle or cycles which have just flowed out of the cylinder). The 2-stroke engine thus runs with an internal recirculation (or internal EGR) of the burned gases at partial load. However, the presence of this internal EGR is not sufficient to obtain the desired self-ignition running. Research work also shows that the mixing between this internal EGR and the fresh gases is to be controlled and limited.

The controlled self-ignition technology applied to 4-stroke engines is particularly interesting because it allows running of the engine with an extremely diluted mixture, with very low fuel/air ratios and ultra-low NOx emissions.

However, this technology experiences a significant technological difficulty insofar as, in order to obtain self ignition in 4 stroke engines without the internal EGR effect of the 2-stroke engine, it is necessary to either increase the compression ratio of the engine very highly (with knocking problems at high load), or to heat up the admitted fresh gases very highly (several hundred degrees C), or to combine both phenomena.

Solutions which decrease pressure and temperature level requirements for 4-stroke engines can be partly provided by suitable additives in the fuel. French patent application EN. 95/10,798 illustrates such a solution.

It is well-known for 4-stroke engines, for example as disclosed by PCT international application WO. 93/16,276, to combine a variable distribution adjustment with a one-way system at the intake in order to decrease pumping losses at partial load. This solution thus allows the engine to run with the intake throttle valve as wide open as possible.

In a different way, the present invention mainly overcomes the aforementioned problems linked with self-ignition 4-stroke engines.

SUMMARY OF THE INVENTION

According to the present invention, reproduction of the self-ignition operating conditions of 2-stroke is sought in 4-stroke engines.

The present invention advantageously provides a solution to the problem of nitrogen oxides emission in 4-stroke engines running with a homogeneous lean mixture.

More precisely, the present invention provides a variable control of the opening and the closing of the intake and exhaust in the combustion chamber as a function notably of the load of the engine.

The process according to the invention consists in performing in combination, and at partial load the steps of:
 a) prolonged retention of burned gases in the combustion chamber, and
 b) a fresh gas intake period which overall follows the retention period,
in order to prevent mixing of the fresh gases with the burned gases and to control the amount of burned gases retained in the combustion chamber.

Step (a) is specifically carried out by delaying the closing of the exhaust beyond the allotted time, i.e. after the top dead center of the piston.

According to an embodiment of the invention, step (a) is carried out by delaying also the opening of the exhaust in relation to normal operation, i.e. by preventing the opening of the exhaust before the bottom dead center.

Furthermore, step (a) can be carried out by decreasing the opening time of the exhaust in relation to normal operation, i.e. by allowing opening of the exhaust during about half of the upstroke of the piston only, in order to limit the escape of too large an amount of burned gases.

To that effect, a variable throttling device can be placed in an exhaust line downstream from at least one exhaust valve.

An improvement can furthermore consist in thermally insulating the exhaust line between the exhaust valve and the variable throttling device.

Moreover, the intake period can be shortened in relation to normal operation, opening of the intake occurring long after the top dead center and closing of the intake occurring before the bottom dead center, so that the intake is open after closing of the exhaust, only during the time necessary for the inflow of fresh gas required for the load of the engine.

Without departing from the scope of the invention, the intake period can be moved in relation to normal operation, opening of the intake occurring long after the top dead center and closing of the intake occurring long after the bottom dead center, so that the intake is open after the closing of the exhaust and closed during compression.

The intake can particularly be closed just before the bottom dead center.

At the same time, the process according to the invention can provide the intake line with a non-return valve.

In particular, the fuel mixture can flow in under pressure at the start of the compression, after the cylinder has been filled with the burned gases.

In cases where a source of pressurized air is used at the intake, this air can also be used for spraying the fuel into the combustion chamber.

According to another feature, the fresh gases can be heated prior to being fed into the engine.

BRIEF DESCRIPTION OF THE DRAWINGS

Other features, advantages and particularities of the present invention will be clear from reading the description hereafter, given by way of non limitative example, with reference to the accompanying drawings wherein.

DESCRIPTION OF THE PREFERRED EMBODIMENTS

The invention keeps a considerable amount of residual burned gases, referred to as EGR in the description hereafter, confined in the cylinder and the combustion chamber at partial load. Furthermore, according to the invention, as little mixing as possible occurs in the combustion chamber between the EGR and the fresh gases, i.e. newly introduced at each intake. This implies that the fresh gases are introduced only when the EGR is completely trapped in the combustion chamber. The fresh gases are preferably introduced as late as possible, just before the compression.

This type of operation is recommended only at partial loads. Outside these operating ranges, the engine will run conventionally, i.e. with an open intake during the downstroke of the piston and a closed exhaust during the upstroke. A slight overlap of these ranges is however recommended in order to obtain better performances.

The present invention thus performs in combination, and at partial loads:

(a) prolonged retention of burned gases in the combustion chamber, (b) a fresh gas intake period which overall follows the burned gas retention period.

Figure 1:
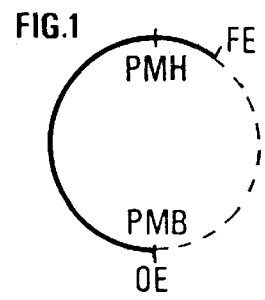
FIG. 1 is a diagram showing the opening time of the exhaust according to an embodiment of the invention.
Figure 2:
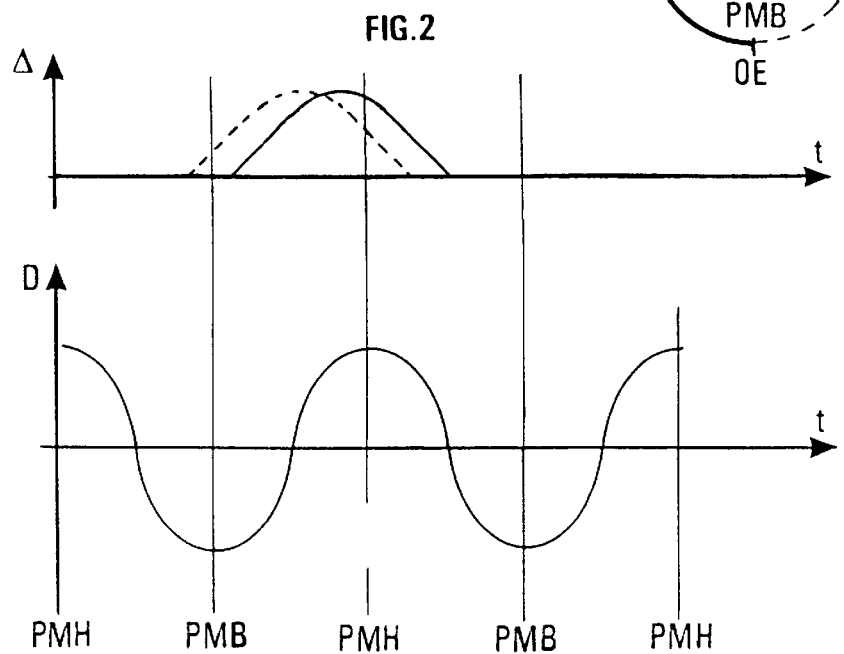
FIG. 2 is a graph showing the parallel motions of the piston and of an exhaust valve according to the same embodiment of the invention.
Figure 3:
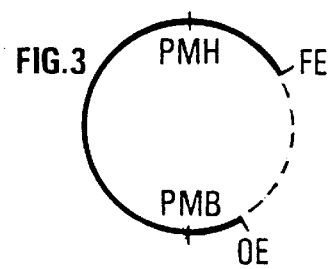
FIG. 3 is a diagram showing the opening time of the exhaust according to another embodiment of the invention.
Figure 4:
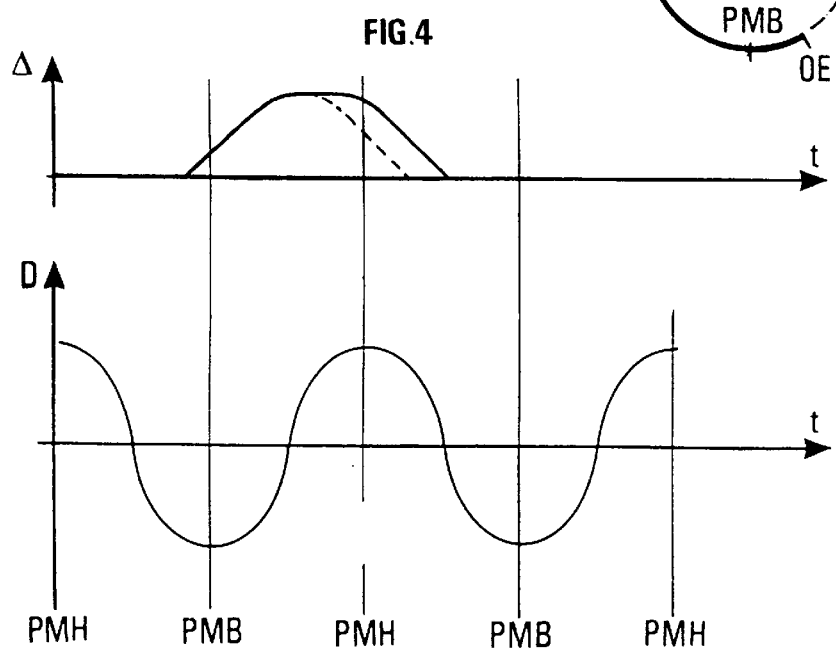
FIG. 4 is a graph showing the parallel evolutions of the piston and of an exhaust valve according to the other embodiment of the invention.

To perform these steps, several solutions can be considered:

in the case of an engine with mechanically cam-actuated exhaust valve(s), the opening period of the exhaust valve(s) will be greatly delayed in the cycle (in relation to the more conventional opening time used at high load) and ends amply during the next downstroke of the piston (intake start on conventional engine). This delay can be obtained either by delaying all of the exhaust opening law (FIG. 1 and FIG. 2), or by increasing the exhaust opening time (FIG. 3 and FIG. 4). Suitable variable distribution mechanical systems allow the obtaining of one or the other case. In FIGS. 2 and 4, the conventional exhaust valve opening law is shown in dotted line in the graph relative to the valve lift Δ as a function of time;

in the case of an engine provided with exhaust valves with totally variable opening during the lift and angular position in the cycle (distributions by electromagnetic or electrohydraulic control), the aforementioned cases can of course be used, but it will be more advantageous on the one hand to prevent part of the internal EGR from escaping into the exhaust and from flowing back into the cylinder (to the piston TDC) and, on the other hand, to open the exhaust for the shortest time possible so as to allow only the desirable amount to escape and to better separate the next intake process.

Figure 5:
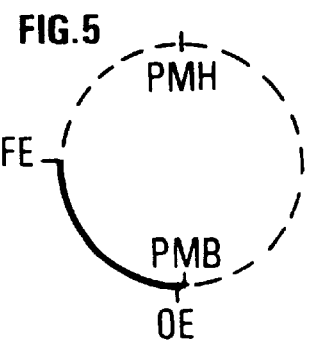
FIG. 5 is a diagram relating to the opening time of the exhaust according to a third embodiment of the invention.
Figure 6:
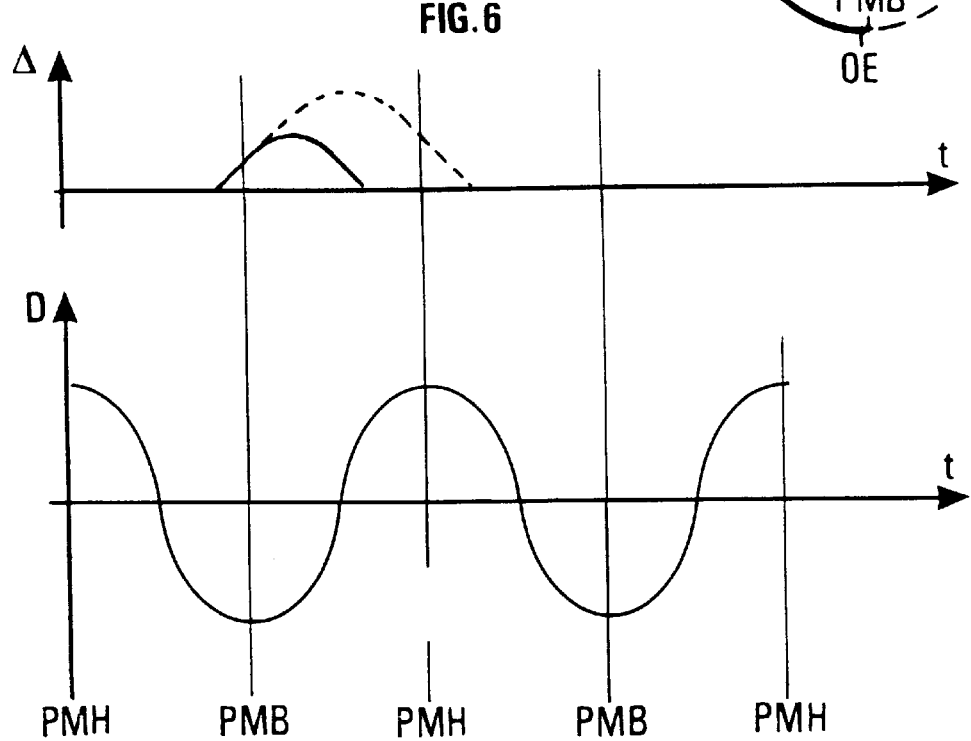
FIG. 6 is a graph showing the parallel evolutions of the piston and of an exhaust valve according to the third embodiment of the invention.

FIGS. 5 and 6 thus show that the exhaust is open for a short time so that it is not complete. The exhaust is preferably opened towards the bottom dead center whereas the closing occurs towards the middle of the compression, i.e. about 45° crankshaft after the opening of the exhaust.

These two solutions can also be improved. In fact, in case of a mechanical distribution, it can be particularly interesting to place a throttling device (for example a butterfly valve or a plug valve) downstream from the exhaust valve(s) so as to increase the internal EGR effect. This may even allow reduction of the need to delay the opening of the exhaust.

Figure 7:
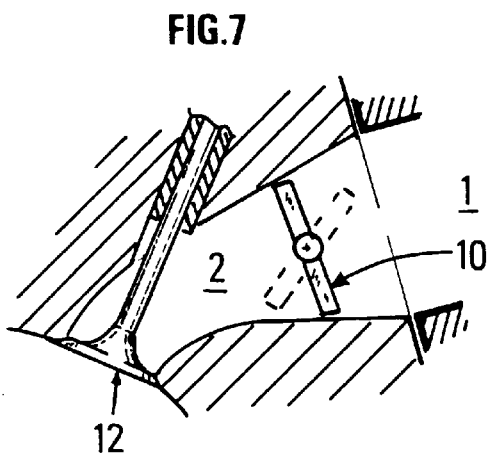
FIG. 7 is a simplified section of an exhaust outlet of an engine according to the invention.

FIG. 7 shows an example of positioning of a throttling element 10 in exhaust line 1, which improves the basic effect of the invention. The other elements of this environment are not described and bear no reference numbers since they are known in the art.

Furthermore, without departing from the scope of the invention, rotating plug valves can be used instead of the valves in order to obtain the appropriate and desired exhaust opening laws.

Another aspect of the invention further starts the intake as late as possible, after the end of the exhaust. This allows delay of the possibility of mixing between fresh gases and burned gases, in other words to improve stratification.

Figure 8:
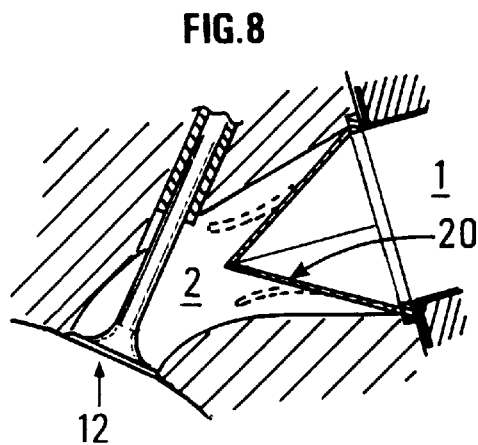
FIG. 8 is a simplified section of an intake of a 4-stroke engine according to the invention.

A solution allowing achievement of this effect can, as shown in FIG. 8, place a non-return valve 20 in intake line 2, just upstream from an intake valve 12.

Figure 9:
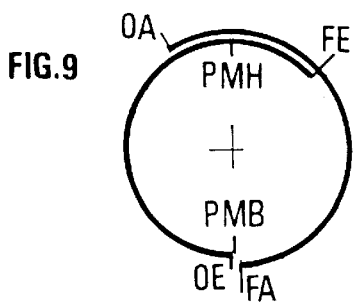
FIG. 9 is a diagram showing respectively the opening times of the exhaust and of the intake according to the embodiment of FIG. 8.
Figure 10:
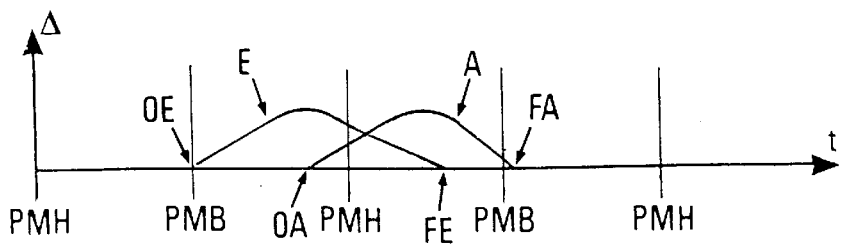
FIG. 10 is a curve showing the evolution with time of an intake valve (curve A) and of an exhaust valve (curve E) respectively.

A non-return valve placed at the intake allows, in the case illustrated in FIGS. 9 and 10, prevention of the burned gases from flowing back to the intake. This backflow phenomenon might in fact occur if the intake valve opens long before the end of the exhaust. The valve overlap is then too great. Valve 20 will then allow the intake to start only when the pressure in the intake manifold, upstream from valve 20, is higher than the pressure in the cylinder. If, as shown in FIGS. 9 and 10, the exhaust remains open after the top dead center, during the start of the piston downstroke, the pressure in the cylinder then remains close to the atmospheric pressure during this time. It will start to drop only when the exhaust is closed, i.e. here about 45° after the top dead center. Valves 20 thus open only at this time, so that the real intake actually takes place after the exhaust.

Figure 11:
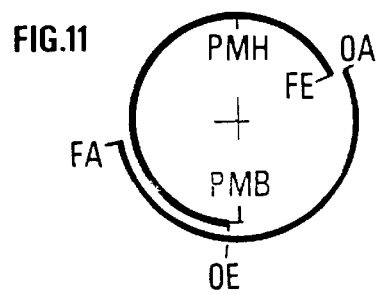
FIGS. 11 and 13 are diagrams showing the opening times of the intake and of the exhaust respectively for two other embodiments of the invention, FIGS. 12 and 14 relate to valve lift curves for the embodiments of FIGS. 11 and 13 respectively.
Figure 12:
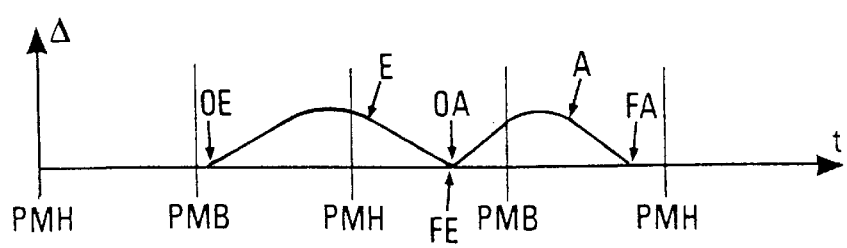

In the embodiment of FIGS. 11 and 12, the valve opening law is intentionally delayed. The intake opens here just after the closing of the exhaust, long after the top dead center. This delay can be obtained by either changing the opening time and the valve lift law, or by completely putting back the intake. On a technological level, the first solution is rather complex whereas the second one can be obtained by camshaft phase lag, which is currently well mastered.

In the embodiment of FIGS. 11 and 12, the non-return valve is quite necessary in order to prevent any backflow during the valve overlap which occurs during compression, so as to maintain a high compression ratio in the combustion chamber.

In the case of an engine with totally variable intake valve drive, such as distributions by electromagnetic or electrohydraulic drive, non-return valve 20 is not essential.

Figure 13:
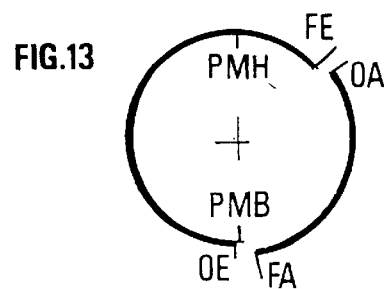
Figure 14:
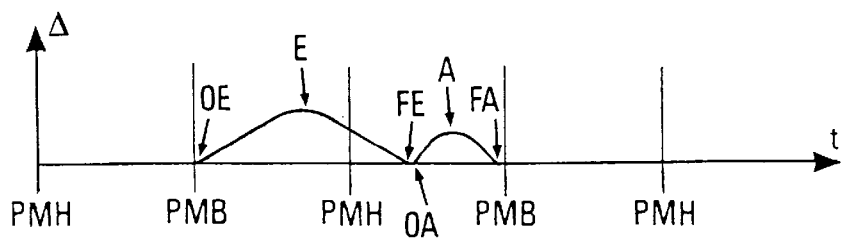

In fact, the intake can then be opened just after the end of the exhaust and, as shown in FIGS. 13 and 14, the intake can be rapidly closed again before the bottom dead center, i.e. before the start of the compression. The intake will preferably be opened just for the minimum time necessary to introduce the amount of fresh gas required for the given load. Automatic and individual control of the valves, which is quite feasible on the technological level, can allow such a sequence.

Another very important case comes into the scope of the invention. In fact, whatever the type of distribution used, it can be very advantageous to seek a maximum filling with residual burned gases in order to facilitate self-ignition combustion even under the lowest load conditions. To that effect, an interesting solution delays the closing of the exhaust even further, for example almost until the start of the cylinder compression, and in opening the intake valve only during the start of the cylinder compression. In this case, the fresh air/fuel mixture feed must be introduced at a pressure slightly above the cylinder pressure. Compressed air coming from a pressure source must thus be used: this pressure source can be a compressor (a Roots type positive-displacement compressor for example, or a screw or a piston compressor where the piston can be one of the pistons of the engine itself), driven either mechanically or electrically. The compressed air necessary for this embodiment can also be used for atomization and spraying of the fuel. To sum up the latter case, everything goes off as if the engine was filled at first to the maximum with residual gases, then supercharged with an air/fuel mixture which provides the fresh charge without taking the place of the burned gases and therefore without decreasing their confined amount.

Without departing from the scope of the invention, rotating plug valves can be used instead of the valves to obtain the appropriate and desired intake opening and closing laws.

Thus, according to the description above, the engine can run conventionally at high loads, with the exhaust opening period during the piston upstroke (after expansion) and the intake period during the piston downstroke (before compression). Under such conditions, the internal EGR and the absence of mixing thereof with the fresh gases are not particularly sought, and the exhaust and intake periods can allow a certain overlap necessary to obtain a high torque. When an exhaust throttling device such as 10 is used, the latter will of course be widely open. The non-return device 20 should have no negative effect for running at high loads, except maybe a slight pressure drop at high speed.

The transition between the conventional mode at high load and with spark ignition, and the mode with partial load and controlled self-ignition according to the invention will thus be achieved by varying the parameters used to control the internal EGR and the minimum mixing between internal EGR and fresh gas, which are:

the variation of the exhaust opening law (at the minimum by variable adjustment), the position of the exhaust throttling device (if provided), the variation of the intake opening law (if used).

In case of a multi-valve engine, the opening of part of the valves can occur as defined according to the invention and another part of the valves will have more conventional opening laws, thus providing good filling of the engine at high loads. Thus, at high loads, all the valves would be active whereas at partial loads, self-ignition running will be sought, the opening of the valves according to conventional opening laws would be deactivated so as to only allow opening of the valves working according to the invention.

In cases where the variation of these control parameters according to the invention should not be sufficient to obtain self-ignition combustion running, other well-known actions such as heating of the fresh gases admitted, compression ratio increase, etc, can additionally be used. However, it is expected from the invention that, in case it does not allow by itself to reach the controlled self-ignition combustion mode, it allows at least reducing the need for complementary actions (for example by reducing the heating level required for the fresh gases).

In order to take advantage of the thermal energy of the residual gases in the case of an engine working according to the invention, the exhaust line can be insulated from the exhaust valve (by ceramization, suitable water circuit, . . . ). This insulation can be extended at least up to the location of exhaust throttling device 10 (if provided).

Finally, without departing from the scope of the invention, the conventional ignition spark is maintained throughout the controlled self-ignition running.

What is claimed is:

1. A process for controlling self-ignition in a four-stroke engine having variable control of opening and closing of intake and exhaust in a combustion chamber under partial load as a function of the load of the engine comprising:

(a) prolonging retention of burned gases in the combustion chamber; and (b) providing a fresh gas intake period which overall follows the retention of burned gases while minimizing mixing of the fresh gases with burned gases and controlling the retention of burned gases in the combustion chamber.

2. A process as claimed in claim 1, wherein a fuel mixture is introduced under pressure at start of compression of a piston in the combustion chamber after filling of the combustion chamber with the burned gases.

3. A process as claimed in claim 1, further comprising:

providing a source of pressurized air in the gas intake period which sprays fuel directly into the combustion chamber.

4. A process as claimed in claim 1, wherein the fresh gases are heated prior to introduction into the combustion chamber.

5. A process as claimed in claim 1, further comprising placing a variable throttling device in an exhaust line downstream from at least one exhaust valve.

6. A process as claimed in claim 5, further comprising insulating the exhaust line between the exhaust valve and the variable throttling device.

7. A control process as claimed in claim 1, wherein step (a) is carried out by delaying closing of the exhaust after top dead center of a piston in the combustion chamber.

8. A process as claimed in claim 7, further comprising placing a variable throttling device in an exhaust line downstream from at least one exhaust valve of the combustion chamber.

9. A process as claimed in claim 7, wherein the fresh gas intake period is shortened by opening of the intake after top dead center of the piston in the combustion chamber and closing of the intake before bottom dead center so that the intake is open after closing of the exhaust only for a time necessary for introduction of the fresh gases required for the load of the engine.

10. A control process as claimed in claim 1, wherein step (a) is carried out by decreasing opening time of the exhaust by allowing opening of the exhaust during only part of an upstroke of the piston in the combustion chamber to limit escape of the burned gases.

11. A process as claimed in claim 10, further comprising placing a variable throttling device in an exhaust line downstream from at least one exhaust valve of the combustion chamber.

12. A process as claimed in claim 7, wherein the gas intake period is delayed by opening of the intake after top dead center of the piston in the combustion chamber and closing of the intake occurring after bottom dead center so that the intake is opened after the closing of the exhaust and closed during compression.

13. A process as claimed in claim 12, wherein a non-return valve is provided in an intake line of the combustion chamber.

14. A process as claimed in claim 7, wherein intake is closed before bottom dead center of the piston in the combustion chamber.

15. A process as claimed in claim 14, wherein a non-return valve is provided in an intake line.

16. A process as claimed in claim 7, wherein step (a) is carried out by also delaying opening of the exhaust by preventing opening of the exhaust before bottom dead center of the piston in the combustion chamber.

17. A process as claimed in claim 16, further comprising placing a variable throttling device in an exhaust line downstream from at least one exhaust valve of the combustion chamber.

18. A process as claimed in claim 16, wherein the fresh gas intake period is shortened by opening of the intake after top dead center of the piston in the combustion chamber and closing of the intake before bottom dead center so that the intake is open after closing of the exhaust only for a time necessary for introduction of the fresh gases required for the load of the engine.

19. A process as claimed in claim 16, wherein the gas intake period delayed by opening of the intake after top dead center of the piston in the combustion chamber and closing of the intake occurring after bottom dead center so that the intake is open after the closing of the exhaust and closed during compression.

20. A process as claimed in claim 16, wherein intake is closed before bottom dead center of the piston in the combustion chamber.

21. A process as claimed in claim 1, wherein the fresh gas intake period is shortened by opening of the intake after top dead center of the piston in the combustion chamber and closing of the intake before bottom dead center so that the intake is open after closing of the exhaust only for a time necessary for introduction of the fresh gases required for the load of the engine.

* * * * *